M. E. Sherwood, Jr.,
Curing Meat.
No. 96,978.    Patented Nov. 16, 1869.
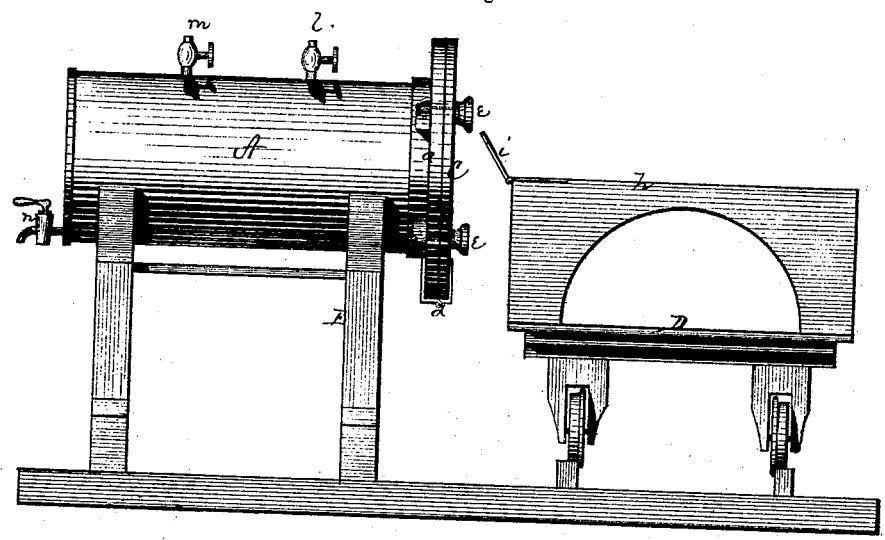
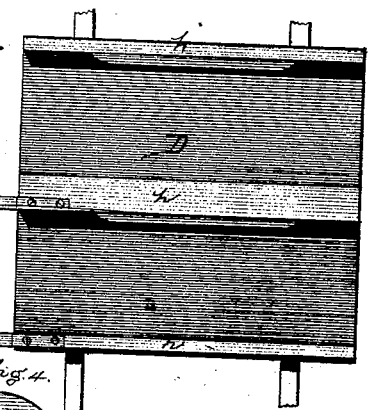
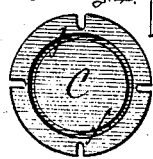

United States Patent Office.

MERRILL B. SHERWOOD, JR., OF BUFFALO, NEW YORK.

Letters Patent No. 96,978, dated November 16, 1869.

IMPROVED APPARATUS FOR CURING MEAT.

The Schedule referred to in these Letters Patent and making part of the same.

*To all whom it may concern:*

Be it known that I, MERRILL B. SHERWOOD, Jr., of Buffalo, in the county of Erie, and in the State of New York, have invented certain new and useful Improvements in Apparatus for Preserving Meat; and do hereby declare that the following is a full, clear, and exact description thereof, reference being had to the accompanying drawings, and to the letters of reference marked thereon, making a part of this specification.

The nature of my invention consists in the construction and arrangement of an apparatus, together with an improved process for salting meat and fish of all kinds.

In order to enable others skilled in the art to which my invention appertains, to make and use the same, I will now proceed to describe its construction and operation, referring to the annexed drawings, in which—

Figure 1 is a side elevation of my apparatus.

Figure 2 is a plan view of the same, part in section.

Figure 3 is an inside view of the lid of the vessel in which the meat or fish is salted, this view being in reduced dimensions.

Figure 4 is an enlarged view of one of the bolts that fasten the lid.

A represents a vessel, which may be of any size or shape desired, but better made of iron, and cylindrical in shape. It is the vessel which, when closed, contains the articles to be salted, which are encased in the crate B, and run into the same, and which, after being closed, is capable of holding a vacuum. It may be closed at the end in any manner, so that the joint is made tight, and capable of maintaining a vacuum without leaking.

I prefer making this joint in the following manner:

On the front end of the cylinder is a circular flange, $a$, made fast to the cylinder, the edge of the same projecting slightly in front of the flange $a$, as seen in fig. 2.

C is the cylinder-head, which is bolted to the flange $a$ by means of the bolts $e\ e$.

The circular groove $f$, in the cylinder-head, into which the edge of the cylinder fits, is provided with rubber packing, and the edge of the cylinder is cut with a thread, so as to jam tightly into said rubber packing.

The bolts $e\ e$ are hinged between ears on the flange $a$; and said flange and the head C have slots cut in them, to let in the bolts from the outside, which bolts are then fastened by nuts.

To take off the head, loosen the nuts on the ends of the bolts $e\ e$, when the bolts can be thrown back by means of the hinges.

At its lower edge, the head C is furnished with a hinge, $d$, so that when it is open, it drops down.

The crate B is made for the purpose of receiving the articles to be salted. It may be of any desired shape to fit the vessel in which it is encased, but should be open or ventilated, so that the fluids or brine may pass easily into and around the articles to be salted.

The crate represented in the drawings is made cylindrical in shape, and to fit easily into the cylinder A. It opens at the top by means of a hinge, and is hung on the wheels $g\ g$, which run on the frame $h$, and across the movable pieces $i\ i$, said pieces being hinged, at one end, to the frame $h$, and drop down, and fit into similar rails, $k\ k$, inside of the cylinder A.

The frame and wheels are the same on each side of cylinder and crate.

The car D is a common platform-car, on the top of which are frames, as above described, to carry one or more crates, as may be desired.

It is convenient to have two crates to one vessel like the vessel A, so that when a crateful that has been salted is removed, another crateful to be salted stands on the car ready to take the place of the one just removed.

The valve $m$ is used to admit the brine or fluids to preserve the meats, and valve $l$ connects with an air-pump, or apparatus for removing the air, and of producing a vacuum.

Valve $n$ is for the purpose of drawing off the fluids.

E is the foundation on which the vessel A rests.

The process of salting and mode of operating the apparatus are as follows:

The meats or fish are placed in the crate B, on the car D, and run to its place before the vessel A, which being open, the crate B is slid into the same, and the vessel then tightly closed by means of the head C and bolts $e\ e$. The brine or fluids used to preserve the meats or fish are then let into the vessel A, through the stop-cock or valve $m$, after which said valve is tightly closed, and, the stop-cock or valve $l$ being open, a vacuum is then produced, by withdrawing the air, by means of an air-pump or other suitable apparatus connected with the valve $l$, and a vacuum, if necessary, maintained for a long or short time, as may be desired, according to the sized pieces, compactness with which they are packed, and according to the degree of salting required.

It will be seen that I produce a vacuum on the meat or fish to be salted after the brine is on them or covers them, which has the effect of opening the texture of the meat, expanding the same, and rendering the brine easily admitted, by its own weight, into and through the meats or articles to be salted. The texture being open, and nothing to resist the same, renders the meats or fish more easily salted than by any other process for salting in vacuum. All other modes for salting in vacuum have more or less pressure on the fluid or brine at the instant it comes in contact with the meat, either by producing pressure on the brine before it comes in contact with the meat, or by the natural pressure of the atmosphere, (which is about fifteen pounds to the square inch,) and pressure, having the effect of compressing at once the texture of the meat which had been previously expanded by vacuum, interfering with the passage of the liquor into the meat, like the compressing of a sponge which it is intended to saturate.

I do not claim salting meat in vacuum as novel, but the process, as herein described, after having placed the articles to be salted and the brine all together in one vessel, to produce a vacuum on all at one time, so as to have no pressure on the meat whatever, except the natural weight of the brine.

The advantage this apparatus and mode of salting have over other modes is, that more meat can be handled and salted in a given time, by vacuum, with this apparatus, and with less expense, than in any other way, it being handled in one bulk, and easily transported from one part of a packing-house to another, without handling, piece by piece, and can be run into the vacuum-vessel in crates, so that one vessel answers the purpose of several vessels to do the same work by any other way; also without the loss of time and expense of getting up pressure where pressure is used.

Having thus fully described my invention,

What I claim as new, and desire to secure by Letters Patent, is—

1. The vessel A, constructed as described, having an opening large enough to admit a full charge of meat or fish at one time, and closing with a tight head, for the purpose of salting meats or fish by vacuum, substantially as herein set forth.

2. The crate or vessel B, constructed as described, to be used as a vehicle to convey meat or fish into the vacuum-vessel, and capable of carrying a full charge at one time, substantially as herein set forth.

3. The arrangement of the platform-car D, having frames $h\ h$ and hinged pieces $i\ i$, for the purpose of carrying one or more crates to and from the vessel in which the meats or fish are salted, substantially as herein set forth.

4. The above-described process of salting meats or fish, by producing a vacuum on said meats or fish after the brine is on them or covers them, substantially as herein set forth.

In testimony that I claim the foregoing, I have hereunto set my hand, this 17th day of August, 1869.

MERRILL B. SHERWOOD, Jr.

Witnesses:
D. A. HOVEY,
E. R. BARNES.